United States Patent
Collard et al.

(10) Patent No.: US 6,777,473 B1
(45) Date of Patent: Aug. 17, 2004

(54) POLYOLEFIN COMPOSITIONS, METHOD FOR THE PRODUCTION AND USE THEREOF

(75) Inventors: Marie-Paule Collard, Vilvoorde (BE); Henri Wautier, Braine-le-Comte (BE); Eric Fassiau, Brussels (BE); Eric Vandevijver, Woluwe-St-Lambert (BE)

(73) Assignee: Solvay Polyolefins Europe-Belgium (Societe Anonyme), Brussels (BE)

( * ) Notice: Subject to any disclaimer, the term of this patent is extended or adjusted under 35 U.S.C. 154(b) by 0 days.

(21) Appl. No.: 09/926,414

(22) PCT Filed: Apr. 25, 2000

(86) PCT No.: PCT/EP00/03734

§ 371 (c)(1),
(2), (4) Date: Oct. 29, 2001

(87) PCT Pub. No.: WO00/66642

PCT Pub. Date: Nov. 9, 2000

(30) Foreign Application Priority Data

Apr. 29, 1999 (BE) .............................................. 9900310

(51) Int. Cl.$^7$ ................................................. C08K 5/13
(52) U.S. Cl. ........................ 524/336; 524/323; 524/345; 524/349; 524/335; 524/337; 524/338
(58) Field of Search ................................ 524/349, 323, 524/345, 335, 336, 337, 338

(56) References Cited

U.S. PATENT DOCUMENTS

| | | | | |
|---|---|---|---|---|
| 4,542,162 A | * | 9/1985 | Rutherford et al. | ............ 521/79 |
| 4,668,721 A | | 5/1987 | Seltzer et al. | .................. 524/95 |
| 5,021,510 A | | 6/1991 | Vroomans | .................... 525/285 |
| 5,650,468 A | | 7/1997 | Vandevijver et al. | ....... 525/285 |
| 6,057,017 A | * | 5/2000 | Tsuri et al. | ................. 428/35.9 |

FOREIGN PATENT DOCUMENTS

| | | |
|---|---|---|
| EP | 0 286 734 | 10/1988 |
| EP | 0 659 784 | 6/1995 |
| EP | 0 849 318 | 6/1998 |
| EP | 0 882 571 | 12/1998 |

OTHER PUBLICATIONS

Patent Abstracts of Japan, JP 62–011703, Jan. 20, 1987.

* cited by examiner

Primary Examiner—Peter D. Mulcahy
(74) Attorney, Agent, or Firm—Oblon, Spivak, McClelland, Maier & Neustadt, P.C.

(57) ABSTRACT

Compositions comprising one or more olefin polymers functionalized by at least one functionalization agent chosen from carboxylic acids, their esters, their anhydrides and their metal salts and one or more stabilizing agents comprising one or more sterically hindered phenol groups and at most one ester functional group. Process for their preparation and use of these compositions for compatibilizing olefin polymers with polymers, fillers and metal substrates which are incompatible with olefin polymers.

17 Claims, No Drawings

POLYOLEFIN COMPOSITIONS, METHOD FOR THE PRODUCTION AND USE THEREOF

The present invention relates to stabilized compositions formed of functionalized polyolefins and in particular stabilized compositions formed of polyolefins functionalized by carboxylic acid groups, their esters, their anhydrides or their metal salts. It also relates to a process for their preparation and to their use.

Functionalized polyolefins are widely used, in particular as adhesive between a polyethylene (PE) layer and a layer of epoxy resin, for example for the coating of pipes. In practice, all plastics are subject to oxidation phenomena, commonly described using the terminology "ageing phenomenon". The most widely used method for slowing down these phenomena is the addition of antioxidizing or stabilizing agents.

Phenolic antioxidants are used as stabilizing agents for polyethylenes. However, their combination with stabilizing agents of phosphite type is generally more effective; see U.S. Pat. No. 4,290,941. A frequently used combination is, for example, a blend of pentaerythrityl tetrakis(3,5-di-t-butyl-4-hydroxyphenylpropionate) and of tris(2,4-di-t-butylphenyl) phosphite.

The problem which is posed in the case of adhesives stabilized in this way, based on polyolefins functionalized by acid or anhydride groups, for example maleic-anhydride-functionalized polyethylene, is a long-term loss in adhesion. Furthermore, these compositions are subject to a loss in thermal stability and to an increase in the viscosity in the presence of moisture (loss in rheological stability), this phenomenon further being accelerated by an increase in the temperature.

The present invention is targeted at overcoming these disadvantages by novel compositions formed of functionalized polyolefins exhibiting better thermal stability and better rheological stability and giving better long-term adhesion.

One aspect of the present invention consequently relates to compositions comprising one or more olefin polymers functionalized by at least one functionalization agent chosen from carboxylic acids, their esters, their anhydrides and their metal salts and one or more stabilizing agents comprising one or more sterically hindered phenol groups and at most one ester functional group.

These functionalized compositions exhibit better rheological stability and give better long-term adhesion.

Furthermore, these compositions are no longer subject to a loss in thermal stability nor to an increase in the viscosity in the presence of moisture.

The stabilizing agents comprising one or more sterically hindered phenol groups and at most one ester functional group are chosen from stabilizing agents comprising one or more sterically hindered phenol groups which comprise an ester functional group and from stabilizing agents comprising one or more sterically hindered phenol groups which do not comprise an ester functional group.

The term "ester functional group" is understood to denote, for the purposes of the present invention, the ester functional group derived from the carboxylic acid functional group within the conventional meaning of organic chemistry (R—CO—O—R').

Mention may be made, among stabilizing agents comprising one or more sterically hindered phenol groups which comprise an ester functional group, of, for example, stearyl β-(3,5-di-t-butyl-4-hydroxy-phenyl)propionate.

Mention may be made, among stabilizing agents comprising one or more sterically hindered phenol groups which do not comprise an ester group, of, for example, 1,1,3-tris(2-methyl-4-hydroxy-5-t-butylphenyl)butane, 2,2'-isobutylidenebis(4,6-dimethylphenol), 2,2'-methylenebis(6-t-butyl-4-methylphenol), 2,6-bis(α-methylbenzyl)-4-methylphenol, 4,4'-thiobis-(6-t-butyl-m-cresol), 2,2'-methylenebis(4-methyl-6-nonylphenol), diisobutylnonylphenol, tris (3, 5-di-t-butyl-4-hydroxybenzyl) isocyanurate, 1,3,5-tris-(4-t-butyl-3-hydroxy-2,6-dimethylbenzyl)-1,3,5-tri-azine-2,4,6-(lH,3H, 5H)-trione, 1,3,5-trimethyl-2,4,6-tris(3,5-di-t-butyl-4-hydroxybenzyl)benzene and their mixtures.

Preferably, at least one of the stabilizing agents does not comprise an ester functional group. In a particularly preferred way, at least one of the stabilizing agents is 1,3,5-trimethyl-2,4,6-tris-(3, 5-di-t-butyl-4-hydroxybenzyl) benzene (Irganox® 1330). In a very particularly preferred way, the compositions according to the invention comprise 1,3,5-trimethyl-2,4,6-tris(3,5-di-t-butyl-4-hydroxybenzyl) benzene as sole stabilizing agent.

The amounts of stabilizing agent employed in the compositions of the present invention depend on various factors, for example on the amount of radical initiator used, on the application intended for the compositions and on the nature of the functionalization agent. The amount of stabilizing agent is generally between 0.001 and 1% by weight.

Generally, the amount of stabilizing agent is greater than or equal to 0.001%, preferably greater than or equal to 0.01%, in a particularly preferred way greater than or equal to 0.1% by weight.

Generally, the amount of stabilizing agent is less than or equal to 1%, preferably less than or equal to 0.75%, in a particularly preferred way less than or equal to 0.5% by weight.

The olefin polymers functionalized by functionalization agents chosen from carboxylic acids, their esters, their anhydrides and their metal salts can be obtained by known techniques, for example by copolymerization or, preferably, by grafting. They are derivatives of polymers formed of linear olefins comprising from 2 to 8 carbon atoms, such as ethylene, propylene, 1-butene, 1-pentene, 1-hexene and 1-octene.

The linear olefins preferably comprise from 2 to 6 carbon atoms, more particularly from 2 to 4 carbon atoms.

The olefin polymers (polyolefins) can be selected from homopolymers of the abovementioned olefins or from copolymers of these olefins, in particular copolymers of ethylene or of propylene with one or more comonomers. The constituent comonomers are advantageously chosen from the abovedescribed olefins and from diolefins comprising from 4 to 18 carbon atoms, such as 4-vinylcyclohexene, dicyclopentadiene, methylene- and ethylidenenorbornene, 1,3-butadiene, isoprene and 1,3-pentadiene.

The polyolefins are preferably chosen from propylene polymers and ethylene polymers, in particular ethylene homopolymer, propylene homopolymer, ethylene copolymers, propylene copolymers, copolymers of ethylene and of propylene, and their mixtures.

The propylene polymers are generally chosen from propylene homopolymers and copolymers with a melt flow index (MFI), measured at 230° C. under a load of 2.16 kg according to ASTM standard D 1238 (1986), of between 0.1 and 100 dg/min.

The ethylene polymers are generally chosen from ethylene homopolymers and copolymers exhibiting a standard density of between 915 and 960 kg/m$^3$ and a melt flow index (measured at 190° C. under a load of 5 kg) of between 0.1 and 200 dg/min.

Ethylene homopolymers and copolymers are particularly preferred. These advantageously exhibit a standard density of at least 915 kg/M$^3$, in particular of at least 936 kg/m$^3$. The standard density generally does not exceed 960 kg/m$^3$, preferably does not exceed 953 kg/m$^3$. The ethylene homopolymers and copolymers, in addition, usually exhibit a melt flow index (measured at 190° C. under a load of 5 kg) of at least 0.1 dg/min, preferably of at least 2 dg/min. The melt flow index generally does not exceed 200 dg/min, more particularly does not exceed 40 dg/min.

The functionalization agent is generally a compound comprising a vinyl unsaturation and optionally one or more aromatic nuclei and/or one or more carbonyl groups. The functionalization agent can be chosen, for example, from unsaturated mono- or dicarboxylic acids and their derivatives, unsaturated mono- or dicarboxylic acid anhydrides and their derivatives, unsaturated mono- or dicarboxylic acid esters and their derivatives or unsaturated mono- or dicarboxylic acid metal salts and their derivatives. The functionalization agents preferably comprise from 3 to 20 carbon atoms. Mention may be made, as typical examples, of acrylic acid, methacrylic acid, maleic acid, fumaric acid, itaconic acid, crotonic acid, citraconic acid, maleic anhydride, itaconic anhydride, crotonic anhydride, citraconic anhydride and their mixtures. Maleic anhydride is very particularly preferred.

In a particularly preferred way, in the compositions according to the invention, at least one of the olefin polymers functionalized by at least one functionalization agent chosen from carboxylic acids, their esters, their anhydrides and their metal salts is an ethylene polymer functionalized by maleic anhydride.

In a very particularly preferred way, in the compositions according to the invention, the only functionalized olefin polymer is an ethylene polymer functionalized by maleic anhydride.

The maleic anhydride is usually present in the functionalized ethylene polymer in an amount of 0.001 to 5% by weight, preferably of 0.01 to 3% by weight and in particular of 0.05 to 1% by weight.

The ethylene polymer functionalized with maleic anhydride advantageously exhibits a standard density of at least 915 kgt/m$^3$, in particular of at least 936 kg/m$^3$. The standard density generally does not exceed 960 kg/m$^3$, preferably does not exceed 953 kg/m$^3$. In addition, it usually exhibits a melt flow index (measured at 190° C. under a load of 5 kg) of at least 0.1 dg/min, preferably of at least 2 dg/min. The melt flow index generally does not exceed 50 dg/min, more particularly does not exceed 22 dg/min.

The compositions according to the invention can, in addition, optionally comprise additives usual for polyolefins in an amount ranging up to 10% by weight, such as additional antioxidizing agents, lubricating agents, fillers, colorants, nucleating agents, UV stabilizers, antiacid agents, such as calcium stearate, agents for modifying the crystallinity, such as a copolymer of ethylene and of n-butyl or ethyl acrylate, agents for deactivating metals or antistatic agents.

One embodiment of the present invention provides for the dilution of the abovedescribed compositions in one or more nonfunctionalized olefin polymers. In the case of nonfunctionalized olefin polymers, they are essentially the compounds mentioned above or their mixtures. The composition can be diluted up to 20 times, that is to say by adding thereto up to 95% by weight of at least one nonfunctionalized olefin polymer, preferably up to 10 times, that is to say by adding thereto up to 90% by weight of at least one nonfunctionalized olefin polymer, in a more than preferred way up to 5 times, that is to say by adding thereto up to 80% by weight of at least one nonfunctionalized olefin polymer.

The compositions according to the invention can be prepared by any process, such as, in particular, solution processes, the processes being carried out in a mixer, for example a Brabender mixer, or the processes being carried out in an extruder. Good results are usually obtained if the compositions according to the invention are prepared by means of the process according to the invention.

The invention also relates to the use of one or more stabilizing agents comprising one or more sterically hindered phenol groups and at most one ester functional group in the stabilization of olefin polymers functionalized by at least one functionalization agent chosen from carboxylic acids, their esters, their anhydrides and their metal salts.

The stabilizing agents comprising one or more sterically hindered phenol groups and at most one ester functional group used in the stabilization are those identified hereinabove.

The olefin polymers which can be stabilized are those identified hereinabove.

The invention also relates to a process for the preparation of stabilized compositions comprising one or more functionalized olefin polymers and one or more stabilizing agents, according to which one or more olefin polymers, one or more functionalization agents, one or more radical initiators, one or more stabilizing agents comprising one or more sterically hindered phenol groups and at most one ester functional group, and optionally one or more additives, are melt blended in a screw extruder.

The stabilizing agent comprising one or more sterically hindered phenol groups and at most one ester functional group which can be introduced into the extruder are those identified hereinabove.

A preferred case is that where at least one of the stabilizing agents introduced into the extruder does not comprise an ester functional group. A particularly preferred case is that where at least one of the stabilizing agents introduced into the extruder is 1,3,5-trimethyl-2,4,6-tris(3,5-di-t-butyl-4-hydroxy-benzyl)benzene. A very particularly preferred case is that where the 1,3,5-trimethyl-2,4,6-tris(3,5-di-t-butyl-4-hydroxybenzyl)benzene is introduced into the extruder as sole stabilizing agent.

The stabilizing agents are usually employed in an amount of between 0.001 and 1% by weight, preferably between 0.01 and 0.75% by weight and in a particularly preferred way between 0.1 and 0.5% by weight.

These olefin polymers are those identified hereinabove.

A preferred process is that in which at least one of the olefin polymers introduced into the extruder is an ethylene polymer exhibiting a standard density of 915 to 960 kg/m$^3$ and a melt flow index, measured at 190° C. under a load of 5 kg, of 0.1 to 200 dg/min.

The functionalization agents which can be introduced into the extruder are chosen from carboxylic acids, their esters, their anhydrides and their metal salts and are essentially those indicated above.

A preferred alternative form of the process is that where at least one of the functionalization agents introduced into the extruder is maleic anhydride.

A very particularly preferred alternative form is that where the only functionalization agent introduced into the extruder is maleic anhydride.

The functionalization agents can be introduced into the extruder either in the solid state or in the molten state. In the latter case, it is necessary to have available an introduction system maintained at a temperature greater than the melting temperature of the functionalization agent.

The functionalization agents are generally used in an amount of 0.001 to 20% by weight, preferably of 0.05 to 10% by weight and in particular of 0.01 to 5% by weight.

The grafting reaction in the process according to the invention takes place under the effect of a radical initiator. Organic peroxides are preferably used as radical initiator. Mention may be made, as typical examples, of t-butyl cumyl peroxide, 1,3-di(2-t-butylperoxyisopropyl)benzene, 3,5-bis (t-butylperoxy)-3,5-dimethyl-1,2-dioxolane, di-t-butyl peroxide, 2,5-dimethyl-2,5-di(t-butylperoxy)hexane, p-menthane hydroperoxide, pinane hydroperoxide, diisopropylbenzene mono-α-hydroperoxide, cumene hydroperoxide, t-butyl hydroperoxide and their mixtures. The preferred radical initiator is 2,5-dimethyl-2,5-di-(t-butylperoxy) hexane.

The radical initiator is generally employed in the process according to the invention in an amount sufficient to allow the grafting to be carried out. The amount is usually between 0.0001% and 1%, preferably between 0.001 and 0.5%, in a particularly preferred way between 0.01 and 0.1% by weight.

The temperature by which the process is carried out is generally greater than the melting temperature and lower than the decomposition temperature of the polyolefin and of the functionalized polyolefin, if possible optionally at an optimum temperature for the radical initiator. The process according to the invention generally involves processing temperatures in the range from 120° C. to 290° C., preferably in the range from 140 to 250° C. and, in a particularly preferred way, in the range from 160 to 220° C.

During the process, it is optionally possible to additionally introduce at any point, for example, up to 10% by weight of conventional additives for polyolefins chosen from those mentioned hereinabove.

The process can also provide for the dilution of the composition in one or more nonfunctionalized olefin polymers. The nonfunctionalized olefin polymers are essentially the compounds mentioned above or their mixtures. The composition can be diluted up to 20 times, that is to say by adding thereto up to 95% by weight of at least one nonfunctionalized olefin polymer, preferably up to 10 times, that is to say by adding thereto up to 90% by weight of at least one nonfunctionalized olefin polymer, in a more than preferred way up to 5 times, that is to say by adding thereto up to 80% by weight of at least one nonfunctionalized olefin polymer.

The dilution of the composition can take place continuously in the screw extruder in which the preparation of the stabilized composition takes place. It can also take place in a device separated from the said extruder, for example in a second extruder, optionally after granulation of the stabilized composition.

The order of introduction of the reactants is generally not critical. The functionalization agent, the stabilizing agent and the radical initiator can be introduced at the same time or independently in any order and optionally portionwise. The stabilizing agent is preferably introduced after the functionalization agent and the radical initiator, in a particularly preferred way after the reaction region.

In a very particularly preferred way, the process for the preparation of stabilized compositions according to the invention comprises the following stages:

a) feeding, under a nitrogen atmosphere, one or more olefin polymers and from 0.001 to 20% by weight of functionalization agent into a corotating twin-screw extruder equipped with a series of associated blending elements with skewed threads, b) feeding from 0.0001 to 1% by weight of a radical initiator, optionally diluted in one or more olefin polymers or optionally introduced by spraying, c) blending one or more molten olefin polymers, the functionalization agent and the radical initiator in the extruder prepared for a time sufficient to graft at least a portion of the functionalization agent onto the molten olefin polymer(s), d) feeding into the extruder from 0.001 to 1% by weight of stabilizing agent and optionally one or more other additives, optionally diluted in one or more olefin polymers, e) devolatilizing the volatile materials by a subsequent stage of devolatilization with hot dry air in a decompression region of the extruder, f) optionally diluting with nonfunctionalized olefin polymers, g) discharging the final composition.

A screw extruder within the meaning of the present invention comprises at least the following parts: a feed region, a reaction region and, at its outlet, a discharge region preceded by a compression region, the latter forcing the molten mass to pass through the discharge region.

In practice, all the stages can be carried out in a corotating or counterrotating single- or twin-screw extruder which generally comprises, in addition to the abovementioned regions, optionally one or more staged feed devices for the said introduction of the polyolefin or polyolefins, functionalization agents, radical initiator and/or stabilizing agent, one or more screw elements allowing the propagation of the material to be extruded, one or more heating regions allowing the constituents to be melted and one or more devolatilization regions. If appropriate, the composition can also be diluted in a region allowing the introduction of nonfunctionalized polyolefin via an appropriate feed device. In addition, the discharge region can be followed by a granulation device.

The process according to the invention is advantageously used for the preparation of the compositions according to the invention.

Finally, an additional aspect provides for the use of the compositions in accordance with the present invention for compatibilizing olefin polymers with polymers, fillers and metal substrates which are incompatible with olefin polymers.

Incompatible polymers are, for example, epoxy resins, fluorinated resins and particularly poly-(vinylidene fluoride), polyamides and polyesters.

The compositions according to the invention are preferably used for compatibilizing olefin polymers with epoxy resins.

Incompatible fillers are, for example, natural fibres, such as flax, hemp, jute and cellulose, and glass fibres, glass, silica, talc, calcium carbonate and carbon black. The metal substrates are, for example, steel or aluminium.

Preferred uses of the compositions according to the invention are multilayer adhesion and the multi-layer coating of steel pipes.

The following examples serve to illustrate the present invention without, however, limiting the scope thereof.

The meanings of the symbols employed, the units expressing the quantities mentioned and the methods for measuring these quantities are explained hereinbelow.

Standard density (SD) of the polyolefin expressed in kg/m$^3$, measured according to ISO standard 1183 (1987).

The melt flow index of the polyolefin (MI$_5$) is determined at 190° C. under a load of 5 kg, 8/2 mm die, according to ISO standard 1133 (1991).

The grafted content of MA is evaluated by IR spectroscopy. Two films are prepared per sample and analysed directly after pressing and then after degassing for 1 h at 120° C. under vacuum in order to remove, if necessary, the residual free anhydride. The MA level, measured by IR, is expressed by the ratio of the absorbance of the carbonyl (1785 cm$^{-1}$) to the absorbance at 3610 cm7'characteristic of PE. The acid level is expressed by the ratio of the absorbance at 1715 cm$^{-1}$ to the absorbance at 3610 cm$^{-1}$. The values obtained are converted to % by weight of grafted maleic anhydride by making use of a relationship based on a titrimetric calibration. The free maleic anhydride is detected by the characteristic bands at 895, 840 and/or 700 cm$^{-1}$.

The thermal stability is determined by measuring the induction period under oxygen at 210° C. according to ASTM standard D 3895 (1992).

The peel strength was evaluated on 5×15 cm three-layer plates. 5×15×3 mm metal plates are sandblasted for at most 24 h before coating. An approximately 100 μm layer of epoxy primer is applied at 200° C. by electrostatic powdering. The plate is placed in a mould base preheated to 200° C. A film of the adhesive composition of the examples hereinbelow with a thickness of approximately 250 μm is applied and then an Eltex® GTB 201 PE plate with a thickness of approximately 3 mm. The peel strength is then measured according to DIN standard 30670 (1991).

In the examples which follow, the base resin is the Eltex® A 4090 P HDPE polyethylene resin with an MI$_5$ of 29 dg/min and a standard density of 952 kg/m$^3$. The maleic anhydride (MA) is milled. The peroxide is 2,5-dimethyl-2,5-di(t-butylperoxy)hexane (DBPH-Peroxyd Chemie). After grafting, the products are dried in an oven at 80° C. under vacuum for 16 h in order to remove the free MA.

EXAMPLE 1

A sample of Eltex® A 4090 P polyethylene functionalized with maleic anhydride in the absence of any stabilizing agent, which comprises 1% of grafted maleic anhydride and which exhibits a melt flow index of 6.6 dg/min before and after hydrolysis, is mixed on a Brabender mixer at 180° C., 50 rotations per minute, for 6 min in the presence of 3 g/kg of the stabilizing agent 1,3,5-trimethyl-2,4,6-tris(3,5-di-t-butyl-4-hydroxybenzyl)benzene (stabilizing agent A).

Half of the sample is hydrolysed in the presence of steam for 7 days at 100° C. and then dried under vacuum overnight at 85° C.

Measurements of the melt flow index and of the thermal stability were carried out on the samples as such or on the samples after hydrolysis. The results of these measurements are summarized in Table I.

EXAMPLE 2 (COMPARATIVE)

The procedure is the same as in Example 1 except that the stabilizing agent employed is the stabilizing agent pentaerythrityl tetrakis(3,5-di-t-butyl-4-hydroxyphenylpropionate) (stabilizing agent B).

The results of the measurements of melt flow index and of thermal stability are summarized in Table I.

TABLE I

| Composition | MI$_5$ without hydrolysis, dg/min | MI$_5$ after hydrolysis, dg/min | Thermal stability without hydrolysis, min | Thermal stability after hydrolysis, min |
|---|---|---|---|---|
| Example 1 | 7.1 | 6.4 | 18.8 | 15.4 |
| Example 2 (comparative) | 7.2 | 0.1 | 18 | 0 |

It is apparent from the analysis of the results that the compositions according to the invention exhibit a constant long-term melt flow index and thermal stability.

EXAMPLE 3

A mixture of linear high density polyethylene (HDPE), sold under the tradename Eltex® A 4090 P, and of maleic anhydride in the solid state, at a content of 0.4% by weight, is fed to a Krupp Werner & Pfleiderer ZSK58 corotating twin-screw extruder.

The extruder is arranged so that it successively comprises the following regions:

(1) Main feed region
(2) Heating region provided with a feed orifice
(3) Reaction region provided with a feed orifice
(4) Degassing region for discharging the volatile materials
(5) Compression region
(6) Discharge region.

The HDPE, blended with the maleic anhydride, is fed to the main feed region under a stream of nitrogen. The peroxide is fed to the main hopper in the feed region at a content of 0.045% by weight in the form of a masterbatch with the HDPE. The stabilizing agent 1,3,5-trimethyl-2,4,6-tris(3,5-t-butyl-4-hydroxy-phenyl)benzene (stabilizing agent A) is added in the region 3 at a content of 0.3% by weight in an HDPE/stabilizing agent masterbatch concentrated 10 fold.

The other operating conditions are as follows:
Temperature profile: 210° C.
Throughput of 180 kg/h
Screw speed: 300 revolutions per minute.

The functionalized polyethylene comprises 0.5% by weight of maleic anhydride and exhibits a melt flow index MI$_5$ of 20 dg/min and a thermal stability of 20 min.

The peel strength was evaluated as described hereinabove on the sample as such or on the sample aged for 15 days at 80° C. in water. The results of the peel strengths, measured at 23° C. and 80° C., are presented in Table II hereinbelow.

EXAMPLE 4 (COMPARATIVE)

The procedure is carried out in the way described in Example 3, except that the stabilizing agent employed is the stabilizing agent pentaerythrityl tetrakis(3,5-di-t-butyl-4-hydroxyphenylpropionate) (stabilizing agent B), all the other conditions being identical.

The results of the peel strengths, measured at 23° C. and 80° C., are presented in Table II hereinbelow.

TABLE II

| Composition | Peel strength at 23° C. (N/50 mm) | | Peel strength at 80° C. (N/50 mm) | |
| --- | --- | --- | --- | --- |
| | 23° C. | 23° C. and aged for 15 d at 80° C. in water | 80° C. | 80° C. and aged for 15 d at 80° C. in water |
| Example 3 | 1150 | 1150 | 562 | 429 |
| Example 4 (comparative) | 1200 | 195 | 550 | 100 |

It may be observed from the analysis of these results that the compositions according to the invention give better long-term adhesion.

What is claimed is:

1. A composition comprising one or more ethylene polymers having one or more functional groups selected from the group consisting of a carboxylic acid, an ester of a carboxylic acid, an anhydride of a carboxylic acid and metal salts thereof, and one or more first stabilizing agents having one or more sterically hindered phenol groups and not more than one ester group, and at least one second stabilizing agent having one or more sterically hindered phenol groups and not having an ester functional group.

2. The composition according to claim 1, wherein the total amount of the stabilizing agents is between 0.001 and 1% by weight.

3. The composition according to claim 1, comprising an ethylene polymer comprising a maleic anhydride functional group.

4. The composition according to claim 3, wherein the maleic anhydride functional group is present in the ethylene polymer in an amount of 0.001 to 5% by weight.

5. The composition according to claim 3, wherein the ethylene polymer having a maleic anhydride functional group has a standard density of 915 to 960 kg/m$^3$ and a melt flow index, measured at 190° C. under a load of 5 kg, of 0.1 to 50 dg/min.

6. The composition according to claim 1, further comprising one or more olefin polymers not having a functional group.

7. A process for the preparation of a stabilized composition comprising one or more ethylene polymers having a functional group and one or more stabilizing agents, said process comprising
melt blending in an extruder one or more ethylene polymers, one or more functionalization agents, one or more radical initiators, one or more first stabilizing agents having one or more sterically hindered phenol groups and not more than one ester group, and one or more second stabilizing agents having one or more sterically hindered phenol groups and not having an ester functional group.

8. The process according to claim 7, wherein at least one of the ethylene polymers melt blended in the extruder is an ethylene polymer having a standard density of 915 to 960 kg/m$^3$ and a melt flow index, measured at 190° C. under a load of 5 kg, of 0.1 to 200 dg/min.

9. The process according to claim 7, wherein at least one of the functionalization agents melt blended in the extruder is maleic anhydride.

10. The process according to claim 7, wherein the melt blending is carried out at a temperature of between 120° C. and 290° C.

11. The process according to claim 7, further comprising:
mixing the stabilized composition with one or more nonfunctionalized olefin polymers.

12. A stabilized composition obtained by the process as claimed in claim 7.

13. The process according to claim 7, further comprising:
mixing the composition with one or more olefin polymers that do not comprise a functional group selected from the group consisting of a carboxylic acid, an ester of a carboxylic acid, an anhydride of a carboxylic acid, and metal salts thereof.

14. The composition as claimed in claim 1, consisting essentially of one of more of the ethylene polymers, the first stabilizing agent and the second stabilizing agent.

15. The process according to claim 7, wherein the stabilized composition consists essentially of one or more of the ethylene polymers, the first stabilizing agent and the second stabilizing agent.

16. The composition as claimed in claim 1, wherein the ethylene polymers are ethylene homopolymers.

17. The process as claimed in claim 7, wherein the ethylene polymers are ethylene homopolymers.

* * * * *